(12) United States Patent
Chang

(10) Patent No.: US 7,723,866 B2
(45) Date of Patent: *May 25, 2010

(54) POWER BACKUP SYSTEM

(75) Inventor: Yu-Yuan Chang, Taipei Hsien (TW)

(73) Assignee: Zippy Technology Corp., Taipei-Hsien (TW)

( * ) Notice: Subject to any disclaimer, the term of this patent is extended or adjusted under 35 U.S.C. 154(b) by 281 days.

This patent is subject to a terminal disclaimer.

(21) Appl. No.: 11/889,552

(22) Filed: Aug. 14, 2007

(65) Prior Publication Data

US 2009/0049322 A1 Feb. 19, 2009

(51) Int. Cl.
*H02J 9/00* (2006.01)
*H02J 3/00* (2006.01)
(52) U.S. Cl. .............................. 307/64; 307/66; 307/85
(58) Field of Classification Search .................. 363/60, 363/69, 70, 71, 95, 65; 323/271, 272, 282; 307/64–66, 82, 85, 86
See application file for complete search history.

(56) References Cited

U.S. PATENT DOCUMENTS

| | | | | |
|---|---|---|---|---|
| 5,612,581 A | * | 3/1997 | Kageyama | 307/64 |
| 5,737,202 A | * | 4/1998 | Shimamori | 363/65 |
| 5,923,549 A | * | 7/1999 | Kobayashi et al. | 363/65 |
| 7,053,502 B2 | * | 5/2006 | Aihara et al. | 307/46 |
| 7,245,469 B2 | * | 7/2007 | Nemoto et al. | 361/65 |
| 7,446,433 B2 | * | 11/2008 | Masciarelli et al. | 307/66 |
| 7,615,890 B2 | * | 11/2009 | Masciarelli et al. | 307/66 |
| 2004/0178679 A1 | * | 9/2004 | Kabasawa | 307/10.1 |
| 2009/0058187 A1 | * | 3/2009 | Chang | 307/66 |

* cited by examiner

*Primary Examiner*—Jessica Han
*Assistant Examiner*—Emily Pham
(74) *Attorney, Agent, or Firm*—Muncy, Geissler, Olds & Lowe, PLLC

(57) ABSTRACT

A power backup system includes a temporary power supply system and a power source switch unit. The power backup system is connected to at least one regular power supply system. In the event that output power of the regular power supply system is abnormal the power source switch unit is connected to the temporary power supply system and output of the regular power supply system. When the regular power supply system is in normal operation it is selected to provide power to drive loads. In the event of power interruption, unstable voltage or abnormal operating condition of the regular power supply system an action to switch power supply system takes places to select the temporary power supply system to maintain power supply and keep the loads to function for a selected time period.

8 Claims, 3 Drawing Sheets

POWER BACKUP SYSTEM

FIELD OF THE INVENTION

The present invention relates to a power backup system and particularly to a backup system that has an altered power output structure coupling with a power supply to ensure normal system operation.

BACKGROUND OF THE INVENTION

Power interruption or unstable power could cause abnormal system shutdown or data damage of computer equipments, or even cause damage of the equipment and result in huge loss. To prevent such a situation from occurring the power supply of conventional computer equipments usually is connected to an Uninterruptible Power Supply (UPS). The UPS provides power to allow the power supply to continuously maintain computer operation so that the computer equipments can get a time window to perform normal storing and machine shutdown. Refer to FIG. 1 for the structure of a conventional UPS and a coupling power supply. When city power is in a normal condition to provide power the power supply has an AC power input end 11 to receive AC power. The AC power passes through a front end commutation unit 12 and a power factor correction unit 13 and is transformed by a transformer 14 regulated by at least a switch 17 controlled by a pulse width control unit 15, and is output through a rear end commutation unit 16. The conventional UPS 60 also is connected to the city power which passes through an AC/DC converter 601, a charge circuit 604, a battery 605, a voltage boosting circuit 603 and a DC/AC converter 602. The input AC power is converted to DC power to charge the battery 605. In the event that the city power is not available the battery 605 outputs DC power which goes through voltage boosting and transformation to become AC power to be delivered to the AC power input end 11 of the power supply so that when blackout or unstable power occurs the power supply still can rely on the power provided by the UPS 60 to function for a selected time period. The conventional structure relies on the power supply to deliver output power. However, abrupt change or unstable of voltage often causes damage of the power supply. If the power supply is damaged because of abnormal input power, it cannot support and drive loads in a normal way even if the UPS has started operation to substitute the city power as the power source for the power supply. Hence there is still room for improvement on the conventional structure in terms of providing normal power supply output in the event of an abnormal condition happened to the power.

SUMMARY OF THE INVENTION

In view of the aforesaid disadvantages occurred to the conventional power supply, the primary object of the present invention is to provide a power backup system to provide power to maintain operation of loads in the event of power interruption, abnormal power condition, or power supply malfunction.

The power backup system of the invention includes a temporary power supply system and a power source switch unit. It is connected to at least one regular power supply system. In the event that abnormal power output occurs to the regular power supply system the power source switch unit is connected to the output of the temporary power supply system and the regular power supply system. When the regular power supply system is in a normal operation condition, it is selected to provide power to drive the loads. When power interruption, unstable voltage or abnormal conditions occurred to the regular power supply system, an action for switching the power supply system takes place to select the temporary power supply system to maintain power supply and keep the loads to continuously function for a selected time period.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
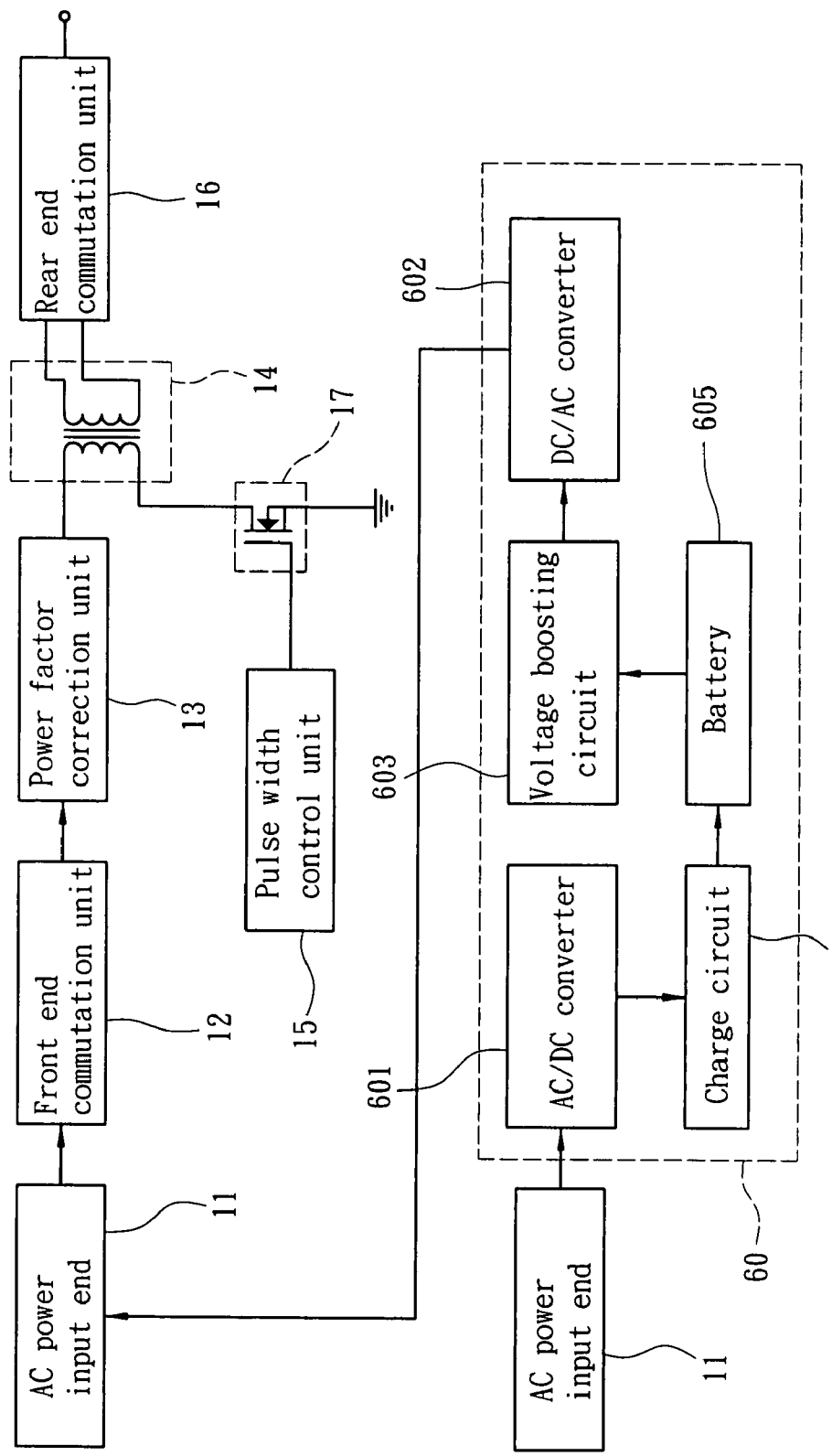
FIG. 1 is a structural block diagram of a conventional Uninterruptible Power Supply.
Figure 2:
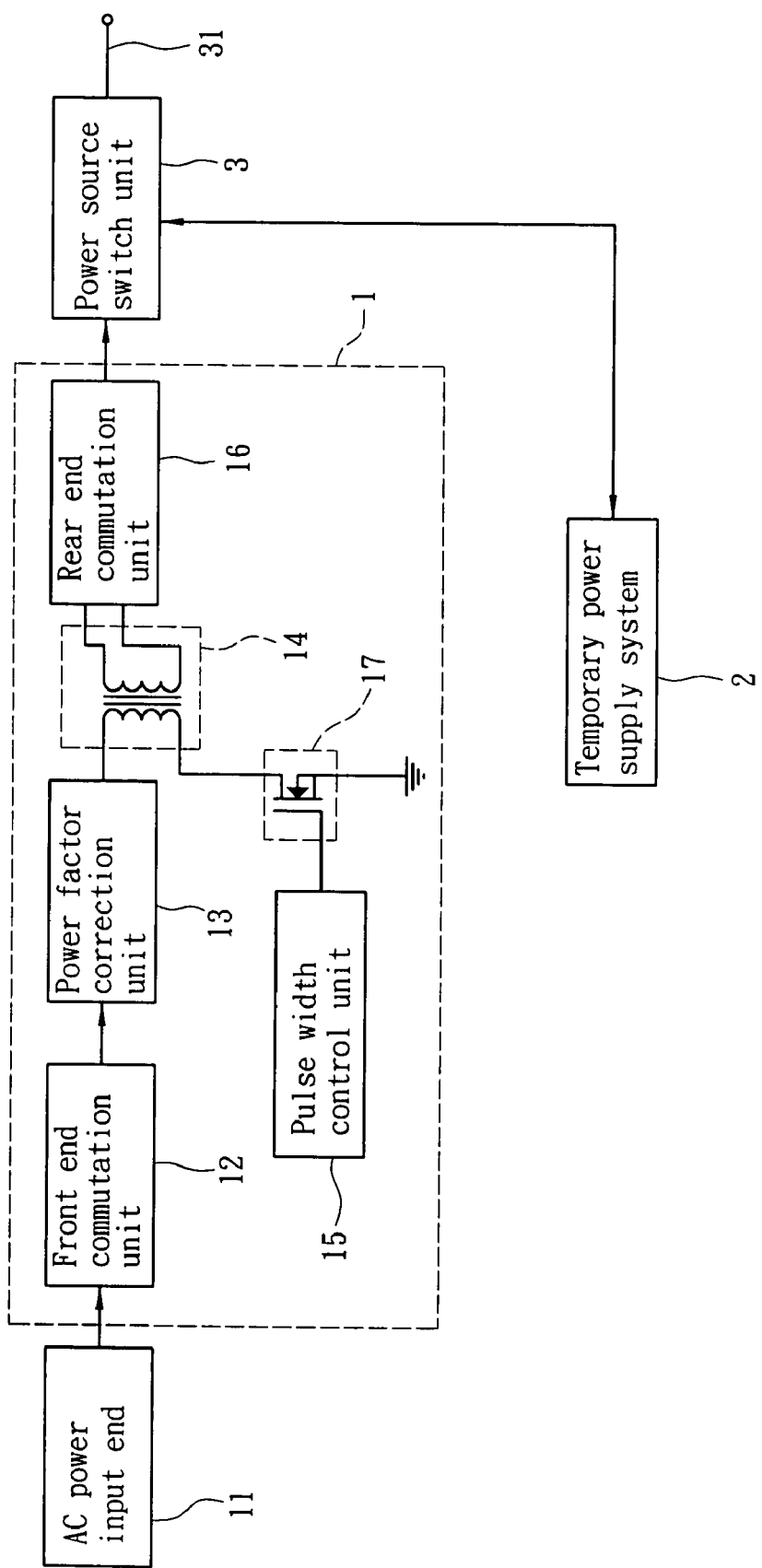
FIG. 2 is a structural block diagram of an embodiment of the invention.

Please refer to FIG. 2 for the structural block diagram of an embodiment of the invention. The power backup system of the invention is connected to at least one regular power supply system. The regular power supply system may be a power supply 1 which includes an AC power input end 11, a front end commutation unit 12, a power factor correction unit 13, a transformer 14, a pulse width control unit 15, a switch 17 and a rear end commutation unit 16. The backup power system includes a temporary power supply system 2 and a power source switch unit 3. The power source switch unit 3 is connected to at least one power supply 1 and the temporary power supply system 2. The temporary power supply system 2 receives DC power input and transforms the power to be output to the power source switch unit 3. The power source switch unit 3 selects the regular power supply system in regular time to provide power which is output through at least one voltage output end 31 at a rear end of the power source switch unit 3. In the event that city power is abnormal or the power supply 1 malfunctions, and output of the regular power supply system is abnormal, the power source switch unit 3 switches and selects the temporary power supply system 2 to temporarily supply power so that the power source switch unit 3 can be connected to loads without losing power immediately.

Figure 3:
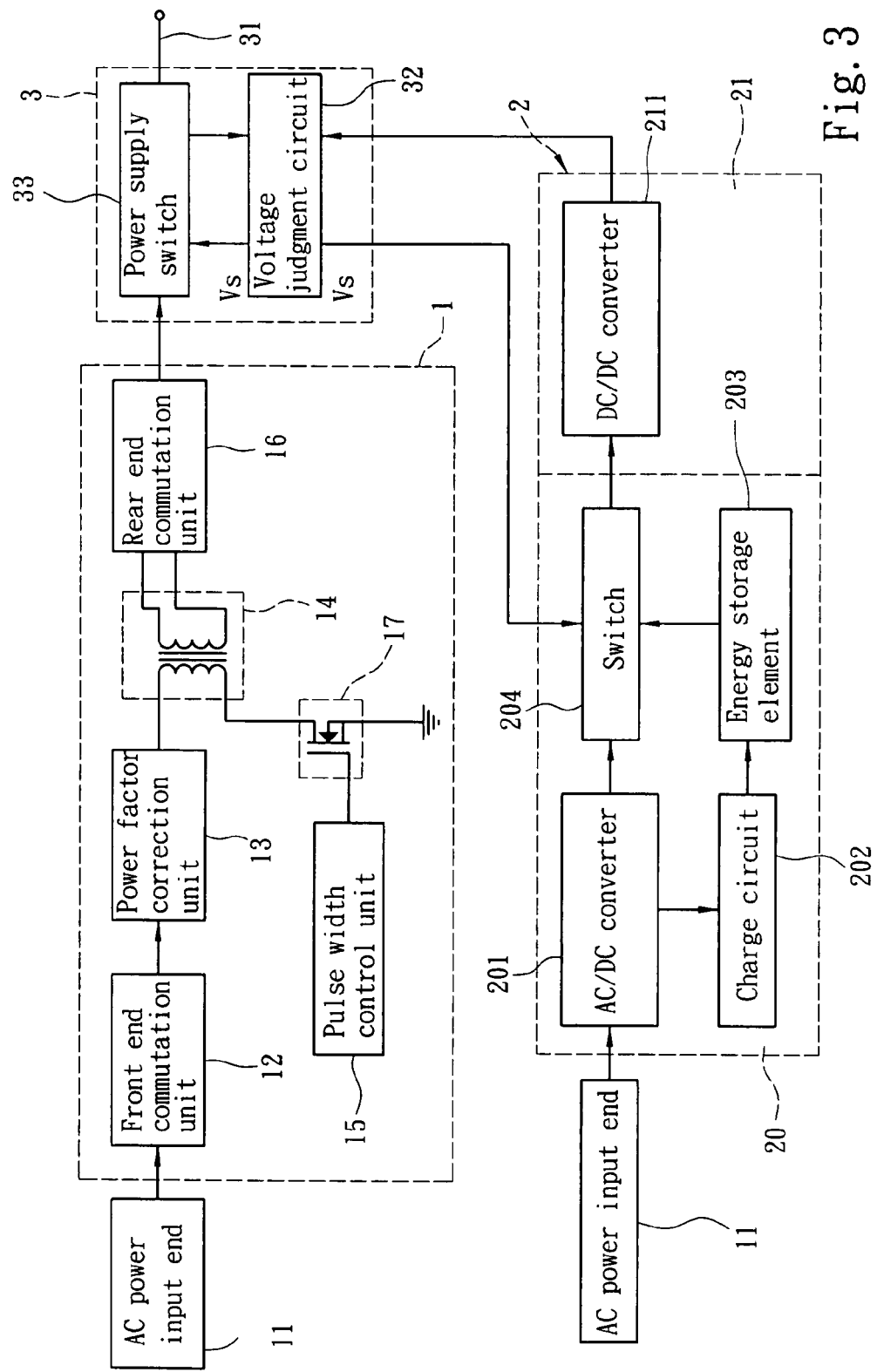
FIG. 3 is another structural block diagram of an embodiment of the invention.

Refer to FIG. 3 for another structural block diagram of an embodiment of the invention. The regular power supply system is a power supply 1. The power source switch unit 3 includes a voltage judgment circuit 32, a power supply switch 33 controlled by the voltage judgment circuit 32 and the voltage output end 31. The temporary power supply system 2 includes a backup power source 20 and a power conversion unit 21. The power supply switch 33 has one end connecting the output of the power supply 1 in regular time. The voltage judgment circuit 32 determines whether output voltage is normal, and through connection of the power supply switch 33 the voltage output end 31 delivers output to drive at least one load. The backup power source 20 of the temporary power supply system 2 includes an AC power input end 11, an AC/DC converter 201, a charge circuit 202, an energy storage element 203 and a switch 204. The AC/DC converter 201 and the power supply 1 are connected to city power to receive AC power which is transformed by the AC/DC converter 201 to charge the energy storage element 203 through the charge circuit 202. The switch 204 has one end bridging the AC/DC converter 201 and the energy storage element 203, and another end connecting to the power conversion unit 21. The power conversion unit 21 is a DC/DC converter 211. The switch 204 is connected to the AC/DC converter 201 in the regular time. The AC/DC converter 201 outputs power to the DC/DC converter 211 through the switch 204 and also sends to the charge circuit 202 at the same time to charge the energy storage element 203. Moreover, the switch 204 is connected to and controlled by the power source switch unit 3. Hence when the AC power of the city power is interrupted, the voltage judgment circuit 32 detects an abnormal voltage output by the regular power supply system, and a switch signal Vs is generated to control one end of the power supply switch 33 to be switched to the temporary power supply system 2, and the power supply switch 33 is immediately connected to the DC/DC converter 211 of the temporary power supply system 2. The switch signal Vs output from the voltage judgment circuit 32 at the same time triggers the switch 204 of the backup power source 20 to be connected to the energy storage element 203 so that the energy storage element 203 provides power through the DC/DC converter 211 and power source switch unit 3 to the load. In the event that the abnormal voltage detected by power source switch unit 3 is caused by malfunction of the power supply 1, the power source switch unit 3 switches and connects to the temporary power supply system 2, and at the same time orders the switch 204 to switch and connect to the energy element 203. The AC power from the regular input continuously passes through the AC/DC converter 201 and the charge circuit 202 to charge the energy storage element 203, and the temporary power supply system 2 can temporarily supply power to the voltage output end 31 to maintain operation of the load.

The backup power source 20 of the temporary power supply system 2 may be changed to receive DC power by changing the AC/DC converter 201 to a DC/DC converter. The power source switch unit 3 may also be built in the power supply 1. And the power supply 1 may have a connection end connecting to the power source switch unit 3 for the temporary power supply system 2. The energy storage element 2 is a battery.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A power backup system connected to at least one regular power supply system to generate an action to switch the power supply system in the event of abnormal output power occurring to the regular power supply system to maintain power supply, the power backup system comprising:
    a temporary power supply system which includes a power conversion unit and a backup power source that are connected to each other; and
    a power source switch unit which has a voltage judgment circuit, a power supply switch controlled by the voltage judgment circuit and a voltage output end, the power source switch unit being connected to the regular power supply system and the temporary power supply system at the same time, the power supply switch having one end connecting to the regular power supply system in regular conditions, the voltage judgment circuit being connected to the power supply switch to get a voltage output from the regular power supply system and delivering output through the voltage output end, the voltage judgment circuit detecting an abnormal voltage output from the regular power supply system and generating a switch signal to control one end of the power supply switch to switch to the temporary power supply system to supply power to the voltage output end;
    wherein the backup power source of the temporary power supply system includes a DC/DC converter, a charge circuit, an energy storage element, and a switch to receive the switch signal and switch a connecting position, the charge circuit being connected to the DC/DC converter which receives DC power and getting the DC power to charge the energy storage element, the switch having one end connected to the DC/DC converter in the regular conditions and triggered by the switch signal to switch to the energy storage element and another end connected to the power conversion unit at a rear end.

2. The power backup system of claim 1, wherein the regular power supply system receives AC power and transforms the AC power to DC power for outputting.

3. The power backup system of claim 2, wherein the regular power supply system is a power supply.

4. The power backup system of claim 3, wherein the power source switch unit is built in the power supply.

5. The power backup system of claim 1, wherein the power conversion unit of the temporary power supply system includes at least one DC/DC converter to receive a DC power and transform the DC power to another DC power to be output to the power source switch unit.

6. The power backup system of claim 1, wherein the energy storage element is a battery.

7. The power backup system of claim 1, wherein the backup power source of the temporary power supply system includes an AC/DC converter, a charge circuit, an energy storage element, and a switch to receive the switch signal and switch a connecting position, the charge circuit being connected to the AC/DC converter which receives AC power and getting DC power to charge the energy storage element, the switch having one end connected to the AC/DC converter in the regular conditions and triggered by the switch signal to switch to the energy storage element and another end connected to the power conversion unit at a rear end.

8. The power backup system of claim 7, wherein the energy storage element is a battery.

* * * * *